United States Patent
Kirby et al.

(10) Patent No.: US 8,627,349 B2
(45) Date of Patent: Jan. 7, 2014

(54) USER INTERFACE

(75) Inventors: Morgan Haden Kirby, Palmer Lake, CO (US); Henry Gregg Martch, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 13/324,831

(22) Filed: Dec. 13, 2011

(65) Prior Publication Data

US 2013/0055304 A1    Feb. 28, 2013

Related U.S. Application Data

(60) Provisional application No. 61/526,565, filed on Aug. 23, 2011.

(51) Int. Cl.
  *H04N 7/167*  (2011.01)
  *H04N 5/445*  (2011.01)
  *H04N 7/20*   (2006.01)

(52) U.S. Cl.
  USPC .................................. 725/31; 725/44; 725/63

(58) Field of Classification Search
  USPC .......................................... 725/44, 52, 31, 63
  See application file for complete search history.

(56) References Cited

U.S. PATENT DOCUMENTS

| | | | |
|---|---|---|---|
| 4,706,121 A | 11/1987 | Young | |
| 5,335,277 A | 8/1994 | Harvey et al. | |
| 5,642,153 A * | 6/1997 | Chaney et al. | 725/40 |
| 5,684,969 A | 11/1997 | Ishida | |
| 5,805,763 A | 9/1998 | Lawler et al. | |
| 6,701,528 B1 | 3/2004 | Arsenault et al. | |
| 6,766,523 B2 | 7/2004 | Herley | |
| 7,024,676 B1 * | 4/2006 | Klopfenstein | 725/49 |
| 7,487,529 B1 | 2/2009 | Orlick | |
| 7,490,169 B1 | 2/2009 | Ogdon et al. | |
| 7,493,312 B2 | 2/2009 | Liu et al. | |
| 7,542,656 B2 | 6/2009 | Cho et al. | |
| 7,577,751 B2 | 8/2009 | Vinson et al. | |
| 7,590,993 B1 | 9/2009 | Hendricks et al. | |
| 7,739,711 B2 * | 6/2010 | Finseth et al. | 725/52 |
| 7,804,861 B2 | 9/2010 | Kim | |
| 7,926,078 B2 | 4/2011 | Arsenault et al. | |

(Continued)

FOREIGN PATENT DOCUMENTS

WO    2011/027236 A1    3/2011

OTHER PUBLICATIONS

International Search Report and Written Opinion of PCT/US2012/51992 mailed Nov. 2, 2012, 15 pages.

(Continued)

*Primary Examiner* — James R Sheleheda
(74) *Attorney, Agent, or Firm* — Kilpatrick Townsend & Stockton LLP (57) ABSTRACT

A method of providing access to a block of stored content includes transmitting a general EPG at a content receiver for display on a presentation device, the EPG including a plurality of channels having a plurality of programs available at a plurality of times, receiving input from a user to display a block guide, and transmitting the block guide wherein, the block guide is associated with the block of stored content for accessing the block of stored content, the block guide including a plurality of channels having a plurality of programs available for a selected airing time.

20 Claims, 8 Drawing Sheets

(56) References Cited

U.S. PATENT DOCUMENTS

| | | | |
|---|---|---|---|
| 7,962,937 B2 | 6/2011 | Cho et al. | |
| 8,437,622 B2 | 5/2013 | Casagrande | |
| 8,447,170 B2 | 5/2013 | Casagrande | |
| 2001/0033736 A1 | 10/2001 | Yap et al. | |
| 2002/0055343 A1 | 5/2002 | Stetzler et al. | |
| 2002/0097340 A1 | 7/2002 | Takagi et al. | |
| 2002/0152299 A1 | 10/2002 | Traversat et al. | |
| 2002/0188943 A1 | 12/2002 | Freeman et al. | |
| 2003/0110514 A1 | 6/2003 | West et al. | |
| 2003/0200548 A1 | 10/2003 | Baran et al. | |
| 2004/0015999 A1 | 1/2004 | Carlucci et al. | |
| 2004/0162871 A1 | 8/2004 | Pabla et al. | |
| 2004/0242150 A1* | 12/2004 | Wright et al. | 455/3.02 |
| 2005/0229213 A1 | 10/2005 | Ellis et al. | |
| 2005/0271365 A1 | 12/2005 | Hisatomi | |
| 2006/0206819 A1 | 9/2006 | Tsuji et al. | |
| 2006/0215993 A1 | 9/2006 | Yamada | |
| 2007/0039032 A1 | 2/2007 | Goldey et al. | |
| 2007/0157253 A1 | 7/2007 | Ellis et al. | |
| 2007/0165855 A1 | 7/2007 | Inui | |
| 2007/0204288 A1 | 8/2007 | Candelore | |
| 2008/0046929 A1 | 2/2008 | Cho et al. | |
| 2008/0092164 A1 | 4/2008 | Agarwal et al. | |
| 2008/0152039 A1 | 6/2008 | Shah et al. | |
| 2008/0184327 A1 | 7/2008 | Ellis et al. | |
| 2008/0216119 A1 | 9/2008 | Pfeffer et al. | |
| 2008/0216136 A1 | 9/2008 | Pfeffer et al. | |
| 2008/0271077 A1 | 10/2008 | Kim et al. | |
| 2008/0288461 A1* | 11/2008 | Glennon et al. | 707/3 |
| 2008/0291206 A1 | 11/2008 | Uchimura et al. | |
| 2009/0100466 A1* | 4/2009 | Migos | 725/40 |
| 2009/0165057 A1 | 6/2009 | Miller et al. | |
| 2009/0178098 A1 | 7/2009 | Westbrook et al. | |
| 2009/0260038 A1 | 10/2009 | Acton et al. | |
| 2010/0020794 A1 | 1/2010 | Cholas et al. | |
| 2010/0158479 A1* | 6/2010 | Craner | 386/92 |
| 2010/0158480 A1 | 6/2010 | Jung et al. | |
| 2010/0313222 A1 | 12/2010 | Lee et al. | |
| 2011/0043652 A1 | 2/2011 | King et al. | |
| 2011/0078750 A1 | 3/2011 | Tam et al. | |
| 2012/0278837 A1* | 11/2012 | Curtis et al. | 725/42 |
| 2012/0311634 A1 | 12/2012 | Van Duyn et al. | |
| 2013/0051555 A1 | 2/2013 | Martch et al. | |
| 2013/0051758 A1 | 2/2013 | Kummer et al. | |
| 2013/0051764 A1 | 2/2013 | Casagrande | |
| 2013/0051766 A1 | 2/2013 | Martch et al. | |
| 2013/0051773 A1 | 2/2013 | Casagrande | |
| 2013/0054579 A1 | 2/2013 | Kennedy | |
| 2013/0055305 A1 | 2/2013 | Martch et al. | |
| 2013/0055310 A1 | 2/2013 | VanDuyn et al. | |
| 2013/0055311 A1 | 2/2013 | Kirby et al. | |
| 2013/0055314 A1 | 2/2013 | Martch | |
| 2013/0055333 A1 | 2/2013 | Kummer | |

OTHER PUBLICATIONS

International Search Report and Written Opinion of PCT/US2012/51987 mailed Oct. 23, 2012, 20 pages.
International Search Report and Written Opinion of PCT/US2012/51984 mailed Nov. 5, 2012, 13 pages.
International Search Report and Written Opinion of PCT/US2012/52002 mailed Oct. 16, 2012, 17 pages.
International Search Report and Written Opinion of PCT/US2012/51964 mailed Nov. 2, 2012, 13 pages.
U.S. Appl. No. 13/149,852, filed May 31, 2011, Non-Final Office Action mailed Dec. 12, 2012, 9 pages.
U.S. Appl. No. 13/215,916, filed Aug. 23, 2011 Notice of Allowance mailed Jan. 4, 2013.
Author Unknown, "Move Networks is Delivering the Next Generation of Television," Move Networks, 2010, obtained online at http://www.movenetworks.com/, 2 pages.
International Search Report and Written Opinion of PCT/US2012/052011 mailed Dec. 17, 2012, 44 pages.
Jung, J., et al., "Design and Implementation of a Multi-Stream CableCARD with a High-Speed DVB-Common Descrambler," ACM Multimedia, 2006, 4 pages.
U.S. Appl. No. 13/286,157, filed Oct. 31, 2011, Non-Final Office Action mailed Jan. 17, 2013, 20 pages.
U.S. Appl. No. 13/215,702, filed Aug. 23, 2011, Notice of Allowance mailed Feb. 11, 2013, 13 pages.
U.S. Appl. No. 13/292,047, filed Nov. 8, 2011 Non-Final Office Action mailed Jan. 18, 2013, 17 pages.
U.S. Appl. No. 13/614,899, filed Sep. 13, 2012 Non-Final Office Action mailed Feb. 5, 2013, 17 pages.
U.S. Appl. No. 13/291,014 filed Nov. 7, 2011 Non-Final Office Action mailed Mar. 29, 2013, 21 pages.
U.S. Appl. No. 13/302,852, filed Nov. 22, 2011, Non-Final Rejection mailed May 23, 2013, 19 pages.

* cited by examiner

PROGRAM GUIDE

THURSDAY, 3/3 — THURSDAY, 3/3 7:11PM

WEEKLY
WEEKLY UPDATE 3-3-2011
PG-13, TV-PG - SERIES/SPECIAL. MORE VIOLENCE OVERSEAS AND THE PRESIDENT'S REACTION TO THE WARS. (CC)

MY HD CHANNELS ▶

| THURSDAY, 3/3 | 7:00 PM | 7:30 PM | 8:00 PM | 8:30 PM | 9:00 PM | 9:30 PM |
|---|---|---|---|---|---|---|
| BOX HD 031-00 HTYP | MECHANICS 101 | | DESIGNING THE INTERIORS | | NEWS HOUR | |
| U TV 020-00 ZEQM | TRACING PEOPLE | | TRACING PEOPLE | | NEWS FIRST | TONIGHT'S NEWS |
| ALM HDTV 009-00 TULA | DORMS | COUPLES | THE STORAGE | OUTDOOR ADVENTURES | HISTORY OF ROCKS | HISTORY OF ROCKS |
| XYZ HD 007-00 IWAK | STRIKEOUT | THINK TANK | THE DOCTORS EMERGENCY | 30 MIN NEWS | THE INSECT SHOW | |
| Q KBT 006-00 PINA | WEEKLY | RULES | GROUP LINE | | THE STATES HISTORY SHOW | |
| ECB 004-00 KNQP | THEORY | | THE POLICE | | THE BRAINIAC | |
| | XYZ | | ECB | | ALM HDTV | |
| | PRIMETIME ANYTIME! WATCH ALL YOUR FAVORITE PRIMETIME SHOWS ANYTIME! | | BOX | | | |
| GGTV | HOUSE FINDERS | | HOUSE FINDERS | | HOUSE FINDERS | |
| GS HD 002-00 JINQ | NEWS SHOW | | SECRETS FROM THE 'OTHERS' | | THE PARTY TOWN | |

131, 138

| | MECHANICS 101 | | THURSDAY, 3/3 7:11PM |
|---|---|---|---|
| | EPISODE 290 PG-13, TV-PG - SERIES/SPECIAL. DOUG AND SUSAN LEARN THE BASICS ON HOW TO MAINTAIN THEIR CARS. (CC) | | |

| PROGRAM GUIDE | | | | MY HD CHANNELS ▸ | |
|---|---|---|---|---|---|
| THURSDAY, 3/3 | 7:00 PM | 7:30 PM | 8:00 PM | 8:30 PM | 9:00 PM | 9:30 PM |
| BOX HD 031-00 HTYP | MECHANICS 101 | | DESIGNING THE INTERIORS | | NEWS HOUR | |
| U TV 020-00 ZEQM | TRACING PEOPLE | | 140 TRACING PEOPLE | | NEWS FIRST | TONIGHT'S NEWS |
| ALM HDTV 009-00 TULA | DORMS | COUPLES | BLOCK GUIDE | OUTDOOR ADVENTURES | HISTORY OF ROCKS | HISTORY OF ROCKS |
| XYZ HD 007-00 IWAK | STRIKEOUT | | THE DOCTORS EMERGENCY | | THE INSECT SHOW | |
| KBT 006-00 PINA | WEEKLY | THINK TANK | GROUP LINE | 30 MIN NEWS | THE STATES HISTORY SHOW | |
| ECB 004-00 KNQP | THEORY | RULES | THE POLICE | | THE BRAINIAC | |
| GS HD 002-00 JINQ | NEWS SHOW | | SECRETS FROM THE 'OTHERS' | | THE PARTY TOWN | |

| STRIKEOUT | | | | THURSDAY, 3/3 7:11PM | |
|---|---|---|---|---|---|
| NOT RESPONSIBLE EPISODE 43 PG-13, TV-PG - SERIES/SPECIAL. REALITY SHOW WHERE CONTESTANTS FIGHT IT OUT TO SEE WHO WINS THE ULTIMATE PRIZE...(CC) | | | | | |

| PROGRAM GUIDE | | | | [PRIMETIME ANYTIME ▼] | |
|---|---|---|---|---|---|
| THURSDAY, 3/3 | 7:00 PM | 7:30 PM | 8:00 PM | 8:30 PM | 9:00 PM | 9:30 PM |
| BOX HD 031-00 HTYP | MECHANICS 101 | | DESIGNING THE INTERIORS | | NEWS HOUR | |
| U TV 020-00 ZEQM | TRACING PEOPLE | | TRACING PEOPLE | | NEWS FIRST | TONIGHT'S NEWS |
| ALM HDTV 009-00 TULA | DORMS | COUPLES | THE STORAGE | OUTDOOR ADVENTURES | HISTORY OF ROCKS | HISTORY OF ROCKS |
| XYZ HD 007-00 IWAK | STRIKEOUT | | THE DOCTORS EMERGENCY | | THE INSECT SHOW | |
| ECB 004-00 KNQP | THEORY | RULES | THE POLICE | | THE BRAINIAC | |
| PRIMETIME ANYTIME! WATCH ALL YOUR FAVORITE PRIMETIME SHOWS ANYTIME! | XYZ | | ECB ← 132 | BOX | ALM HDTV | |

FIG.6

STRIKEOUT
NOT RESPONSIBLE
EPISODE 43
PG-13, TV-PG - SERIES/SPECIAL. REALITY SHOW WHERE CONTESTANTS FIGHT IT OUT TO SEE WHO WINS THE ULTIMATE PRIZE...(CC)

THURSDAY, 3/3
7:11PM

PROGRAM GUIDE

| THURSDAY, 3/3 | 7:00 PM | 7:30 PM | 8:00 PM | 8:30 PM | PRIMETIME ANYTIME ▸ | |
| --- | --- | --- | --- | --- | --- | --- |
| | | | | | 9:00 PM | 9:30 PM |
| BOX HD 031-00 HTYP | MECHANICS 101 | | DESIGNING THE INTERIORS | | NEWS HOUR | |
| ALM HDTV 009-00 TULA | DORMS | COUPLES | THE STORAGE | OUTDOOR ADVENTURES | HISTORY OF ROCKS | HISTORY OF ROCKS |
| XYZ HD 007-00 IWAK | STRIKEOUT | | THE DOCTORS EMERGENCY | | THE INSECT SHOW | |
| ECB 004-00 KNQP | THEORY | RULES | THE POLICE | | THE BRAINIAC | |
| | XYZ | | ECB | | BOX ALM HDTV | |

↙ 132

PRIMETIME ANYTIME!
WATCH ALL YOUR FAVORITE
PRIMETIME SHOWS ANYTIME!

STRIKEOUT
NOT RESPONSIBLE
EPISODE 43
PG-13, TV-PG -- SERIES/SPECIAL. REALITY SHOW WHERE CONTESTANTS FIGHT IT OUT TO SEE WHO WINS THE ULTIMATE PRIZE...(CC)

THURSDAY, 3/3
7:11PM

PROGRAM GUIDE

| THURSDAY, 3/3 | 7:00 PM | 7:30 PM | 8:00 PM | 8:30 PM | PRIMETIME ANYTIME ▸ | |
|---|---|---|---|---|---|---|
| | | | | | 9:00 PM | 9:30 PM |
| BOX HD 031-00 HTYP | MECHANICS 101 ▸ | | DESIGNING THE INTERIORS ▸ | | NEWS HOUR | ▸ |
| ALM HDTV 009-00 TULA | DORMS ▸ | COUPLES ▸ | TH 2/24 2/17 2/10 | | HISTORY OF ROCKS ▸ | HISTORY OF ROCKS ▸ |
| XYZ HD 007-00 IWAK | STRIKEOUT | | | | THE INSECT SHOW | ▸ |
| ECB 004-00 KNQP | THEORY ▸ | | RULES ▸ | | THE BRAINIAC | ▸ |
| | XYZ | | ECB | | ALM HDTV | |
| PRIMETIME ANYTIME! WATCH ALL YOUR FAVORITE PRIMETIME SHOWS ANYTIME! | | | BOX | | | |

146 (pointer to DESIGNING THE INTERIORS)
132

USER INTERFACE

CROSS REFERENCE TO RELATED APPLICATION

The present application claims the benefit under 35 U.S.C. §119(e) of U.S. Provisional Patent Application No. 61/526,565, which was filed on Aug. 23, 2011, and entitled "User Interface," which is incorporated by reference into the present application in its entirety.

FIELD OF THE INVENTION

The present application relates generally to grouping, transmitting, storing, and providing access to information. More particularly, the present application relates to grouping transmitting, storing, and providing access to audiovisual content based on selected television channels and selected times. Still more particularly, the present application relates to providing a user interface for accessing the audiovisual content.

SUMMARY

In one implementation, systems and methods of providing access to a block of content may include determining a block of content from a plurality of instances of received content being received by a tuner from a same frequency band of at least one content provider broadcast or a stored instances of such content and transmitting a block list including such block content in response to a user request. Content from the block list may be accessed in response to selections received in response to presentation of the block list. The method may also include transmitting a general EPG at a content receiver for display on a presentation device. The EPG may include a plurality of channels having a plurality of programs available at a plurality of times. The block list may be configured as a block guide that includes a plurality of channels having a plurality of programs available for a selected airing time.

In another implementation, systems and methods for providing access to content may include determining a block of content from a plurality of instances of received content being received by a tuner from a same frequency band of at least one content provider broadcast or a stored instances of such content and transmitting a block list including such block content in response to a user request. The method may also include receiving user input requesting display of an instance of content available in the block list and determining if the program is available live or from a stored state. The method may also include transmitting the content to the presentation device live if the program is available live. However, where the program is not available live, the method may include accessing the block of stored content and transmitting the stored content to the presentation device. The block list may be configured as a block guide that may include a plurality of channels having a plurality of programs available for a selected airing time and the airing time may correspond to a time frame for which content has been or is scheduled to be stored as a block of stored content.

In various implementations, a user interface may be provided that may include a menu displayed at a presentation device and associated with a block of content. The menu may include an arrangement of television network names along a first side of the menu, the network names each being associated with a network defined by network content in the block of content, wherein each network is related to the other named networks by an attribute. The menu may also include an arrangement of time slots along a second side of the menu. The second side of the menu may be substantially orthogonal to the first side to form a tabular display and the time slots may fill a time window having a selected start time and a selected end time. The menu may also include references to content arranged in the tabular display, each reference corresponding to a network name and at least one time slot.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

The description that follows includes sample systems, methods, and computer program products that embody various elements of the present disclosure. However, it should be understood that the described disclosure may be practiced in a variety of forms in addition to those described herein.

Users of content receivers may desire to access different instances of content that are broadcast simultaneously and/or substantially contemporaneously by content providers. For example, many television programming viewers wish to watch different television programs that occupy the same broadcast time slot, such as the different television programs associated with the major television programs that are broadcast between seven PM and ten PM mountain time. Content receivers may attempt to address this issue by utilizing multiple tuners that can each separately present and/or record different, simultaneously broadcast instances of content. However, a separate tuner may still be required for each simultaneous or substantially contemporaneous instance of broadcast or otherwise received content that a content receiver user wishes to view and/or record. Further, in addition to separate tuners required for each instance of content, the content receiver may require sufficient resources to descramble and store each of the instances of content desired by the user.

Figure 1:
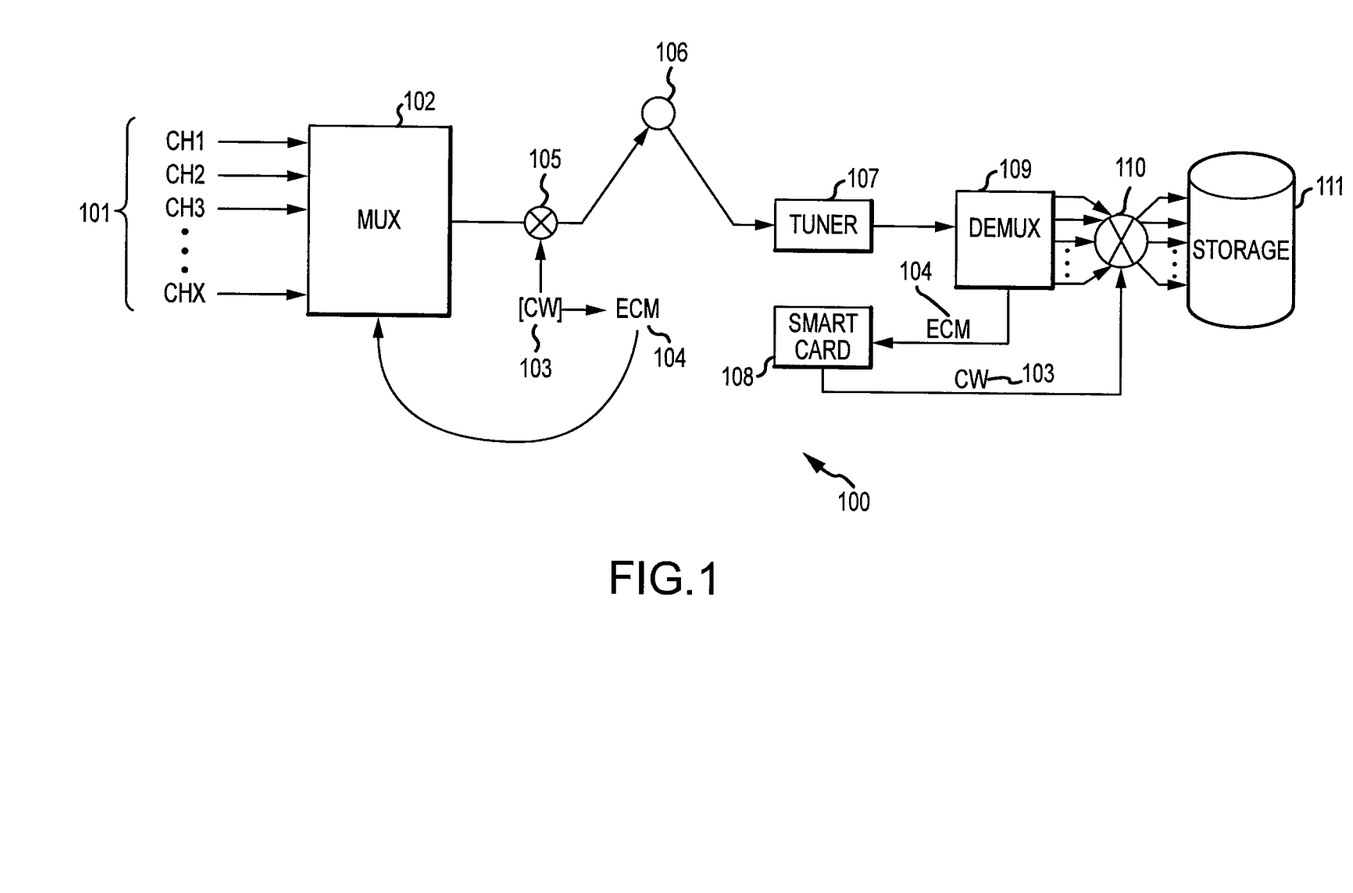
FIG. 1 is a schematic diagram of a system according to some implementations.

FIG. 1 is a block diagram illustrating a system 100 for automatically recording multiple instances of content from one or more programming providers. The automatic recording of multiple instances of content provided by the system 100 may enable users of content receivers to access different instances of content that are broadcast simultaneously and/or substantially contemporaneously by content providers.

In various broadcast systems, content providers may broadcast content to a plurality of different content receivers via one or more frequency bands utilizing one or more satellites. Each multiplexed signal contained in the frequency band (sometimes referred to as a transponder) may be configured to include data related to one or more instances of content, such as one or more television programming channels. The data related to each of the instances of content included in each frequency may be scrambled utilizing one or more CWs (control words), which may then be encrypted to generate one or more ECMs (entitlement control messages) which may in turn be included with the data. A content receiver may typically tune to one or more of the frequency bands to receive the multiplexed signal that contains data for a particular programming channel utilizing one or more tuners. The content receiver may process only a subset of the programming channels by keeping the data associated with the particular programming channel and discarding data received via the tuned frequency band and multiplexed signal associated with other programming channels. The content receiver may decrypt the ECM included with the data associated with the particular programming channel to obtain the CW, descramble the data utilizing the CW, and store and/or transmit the data (e.g., decompressed, reconstructed audio and video data) to one or more presentation devices.

As illustrated in FIG. 1, in this implementation, one or more content providers may select multiple instances of content 101 to be automatically recorded such as by utilizing predefined recording parameters. For example, a content provider may select all of the television events defined as "primetime events" associated with all channels defined as "primetime television channels" for a particular period of time defined as "prime time" to be automatically recorded. In other examples, the content provider may select television events associated with programming channels for a particular time period (such as a half hour, multiple hours, and/or an entire programming day) in response to user selections. After the content provider selects the multiple instances of content, the multiple instances of content may be multiplexed utilizing a multiplexer 102. The multiplexed signal (which includes the multiplexed selected multiple instances of content) may then be scrambled by a scrambler 105 utilizing one or more CWs 103. The CW may be encrypted to generate an ECM, which may be included with the multiplexed signal. The scrambled multiplexed signal may then be included in a broadcast on a frequency band (e.g., cable, satellite), which may then be transmitted to one or more satellites 106 for broadcast. The satellite 106 may receive the frequency band (uplink frequency band) and then broadcast the multiplexed signal to a number of content receivers on a translated frequency band (downlink frequency band), such as a content receiver that includes a tuner 107.

The tuner 107 may tune to the frequency band that includes the multiple instances of content (which may be performed in response to one or more recording instructions received by the content receiver that includes the tuner from the content provider). The data received via the tuned frequency may be demultiplexed by a demultiplexer 109 and then descrambled by a descrambler 110 utilizing the CW before being stored in a non-transitory storage medium 111 (which may take the form of, but is not limited to, a magnetic storage medium; optical storage medium; magneto-optical storage medium; read only memory; random access memory; erasable programmable memory; flash memory; and so on) based on recording parameters, such as predefined recording parameters. The demultiplexer 109 may obtain the included ECM 104, and the ECM may be provided to a smart card 108 that may decrypt the ECM 104 to obtain the CW 103 for the descrambler 110. Hence, the multiple instances of content may subsequently all be available to a user of the content receiver (until such time as they are removed from the non-transitory storage medium) without requiring multiple tuners to receive each of the multiple instances of content, without requiring the smart card to decrypt multiple ECMs. In some implementations, the multiple instances of content may be stored in a single file.

In at least one embodiment, the tuner 107 may receive multiple instances of content which may be simultaneously recorded and/or watched by one or more users. For example, in one embodiment, the tuner 107 may operate to receive instances of content (e.g., multiple television channels or multiple programs) multiplexed together on single tuned frequency. Furthermore, in at least one embodiment, each of the multiple instances of content may be encrypted using a single control word. As described above, the multiple instances of content may be received, decrypted and/or stored onto the storage medium 111. Simultaneously, a user may request to view one or more of the received programs. A receiver may demodulate and output the signal to a presentation device for presentation to a user. In association with reception of the content, the receiver performs appropriate processing to select portions of the received plurality of content associated with the selected channel for further processing and output.

In at least one embodiment, a single tuner 107 and smart card 108 may be utilized to receive, process and output multiple instances of content to multiple devices simultaneously. For example, the tuner 107 may simultaneously receive content associated with the big four tv networks (CBS, NBC, ABC, Fox) which are encrypted using the same control word and multiplexed into the same tuned frequency. The smart card 108 performs processing for simultaneously decrypting a plurality of the channels and the decrypted signals may be output to multiple presentation devices, either using the same output device (e.g., one set-top box with multiple outputs) or via multiple output devices which are communicatively coupled over a network or other communication link (e.g., multiple set-top boxes).

Although the system 100 is illustrated in FIG. 1 and is described above as including a number of specific components configured in a specific arrangement, it is understood that this is for the purposes of example and other arrangements involving fewer and/or additional components are possible without departing from the scope of the present disclosure. For example, in various implementations, the multiple instances of content may be individually scrambled utilizing the control word prior to multiplexing. In another example, in some implementations, the data received via the tuned frequency may be descrambled utilizing the control word before being demultiplexed.

The multiple instances of content have been described in the context of primetime television and thus the multiple instances of content have been described as relating to content available on selected popular network television channels during a particular period of the day. In other implementations, the multiple instances of content may be related to otherwise related channels. That is, rather than primetime channels, the multiple instances of content may include a group of selected sports channels, decorating channels, shopping channels, cartoon channels, cooking channels, or other groups of channel related by subject matter and may further include a time period within which these channels are commonly watched. For example, multiple instances of content may include a group of morning talk shows and may cover a time period from approximately 7:00 am to 10:00 am. Other groups may include afternoon talk shows, soaps, or news broadcasts. Other multiple instances of content may include groups of channels selected based on demographics of a group of users, for example. That is, where a study is performed suggesting that a particular group of users watches a particular set of channels in a particular time period each day, the particular channels within that time period may define multiple instances of content.

The multiple instances of content may also include information and/or data and may thus not be limited to television programming or audiovisual content, for that matter. For example, a bundle of data or a bundle of groups of data may also be processed as described above. Where a single CW is used for the several groups of data, the several channels, or other instances of content or information, large volumes of data and/or content may be transmitted without requiring multiple tuners to receive each of the multiple instances of content, without requiring the smart card to decrypt multiple ECMs, and/or without requiring the combiner 109 to have to descramble multiple signals. Accordingly, while the remaining portion of the application may include reference to prime-time television and thus be focused on a particular set of channels for a particular period of time, other groups of content may also be provided and the methods, menus, and systems for accessing the content may be reflective of the type of content or information stored.

Figure 2:
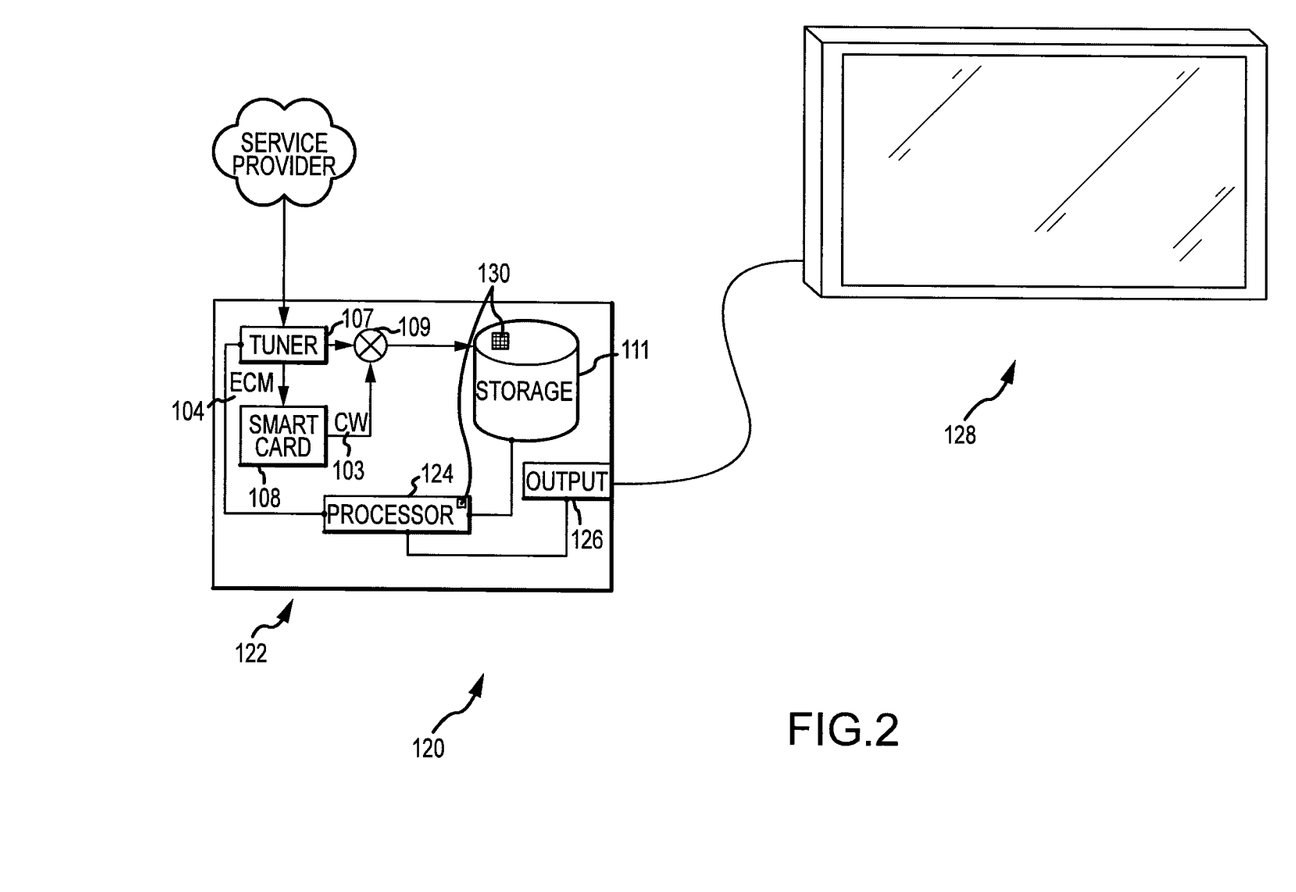
FIG. 2 is a diagram of another system including portions of the system according to FIG. 1.

Referring now to FIG. 2 a system 120 for accessing and displaying the multiple instances of content may be described. The system 120 may include some parts of the system 100 shown in FIG. 1 as part of a content receiver 122. The content receiver 122 may further include a processor 124 and an output 126. The system 120 may also include a presentation device 128 connected to the output 126 of the content receiver 122. The content receiver 122 may be configured for performing the storage function of the system of FIG. 1 and may also be configured for processing information from the service provider and/or processing data stored in the storage medium 111. The content receiver 122 may also be configured for interfacing with a user to receive commands or instructions. As such, the content receiver 122 may include an interfacing module 130 for processing menu related data, for example. The interfacing module 130 may receive menu data from a service provider or read the data from the storage medium 111. The interfacing module 130 may send menus to the presentation device for display and may receive input from the user via a remote control used by the user in conjunction with the menu. The interfacing module 130 may adjust, change, or adapt the displayed menu based a users selections and/or predefined preferences. Upon selection of content, the content receiver 122 may also send selected content or other content to the presentation device for display. The presentation device 128 may be configured for receiving the content or information from the content receiver 122 and displaying the content or information for viewing and/or interaction by the user.

The interfacing module 130 may include software, hardware, or a combination of software and hardware configured for interfacing with the user. In some implementations, the interfacing module 130 may include computer-implemented instructions stored on the computer readable storage medium 111 in the content receiver 122, for example. The computer-implemented instructions may be for displaying particular menus and waiting for user input relating to the menus and either displaying an additional menu or prompting the user based on user input or accessing the content selected by the user. The interfacing module 130 may also include databases, tables, or otherwise arranged files for storing information for populating the menus. The databases, tables, or otherwise arranged files may be updated periodically with additional information relating to current programming availability.

Although the content receiver 122 is illustrated and described above as including the tuner 107 and the storage 111, it is understood that other arrangements are possible without departing from the scope of the present disclosure. For example, in various implementations the tuner 107 and/or the storage 111 may be components of another content receiver (not shown) with which the content receiver 122 is configured to communicate. As such, the content receiver 122 may be operable to communicate with the other content receiver in order to access and/or present content received and/or stored by the other content receiver. In such cases, the content receiver 122 may not include a tuner and/or storage similar to the tuner 107 and the storage 111.

Figure 4:
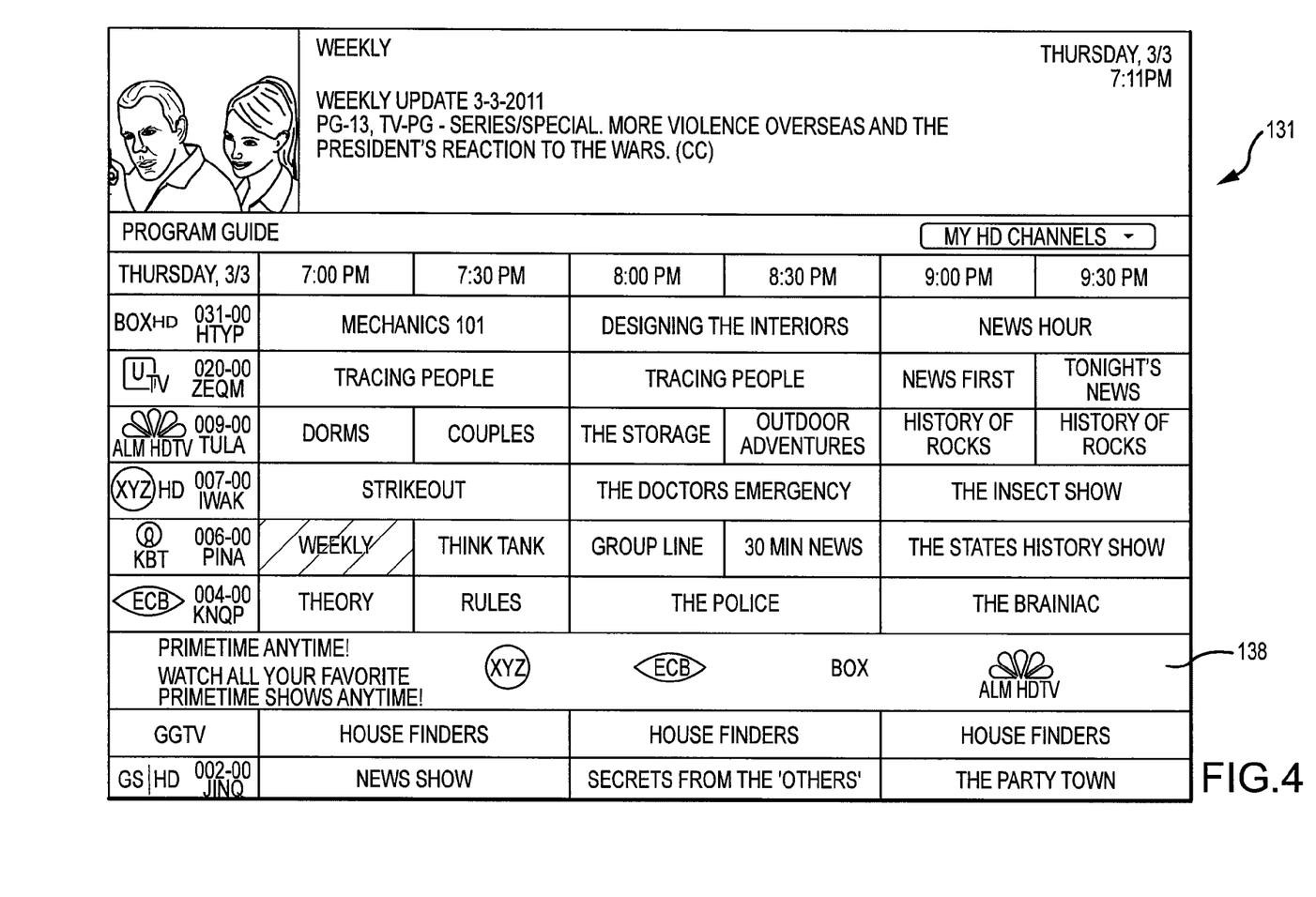
FIG. 4 is a diagram of an electronic program guide showing another option for accessing a block guide, according to another implementation.
Figure 5:
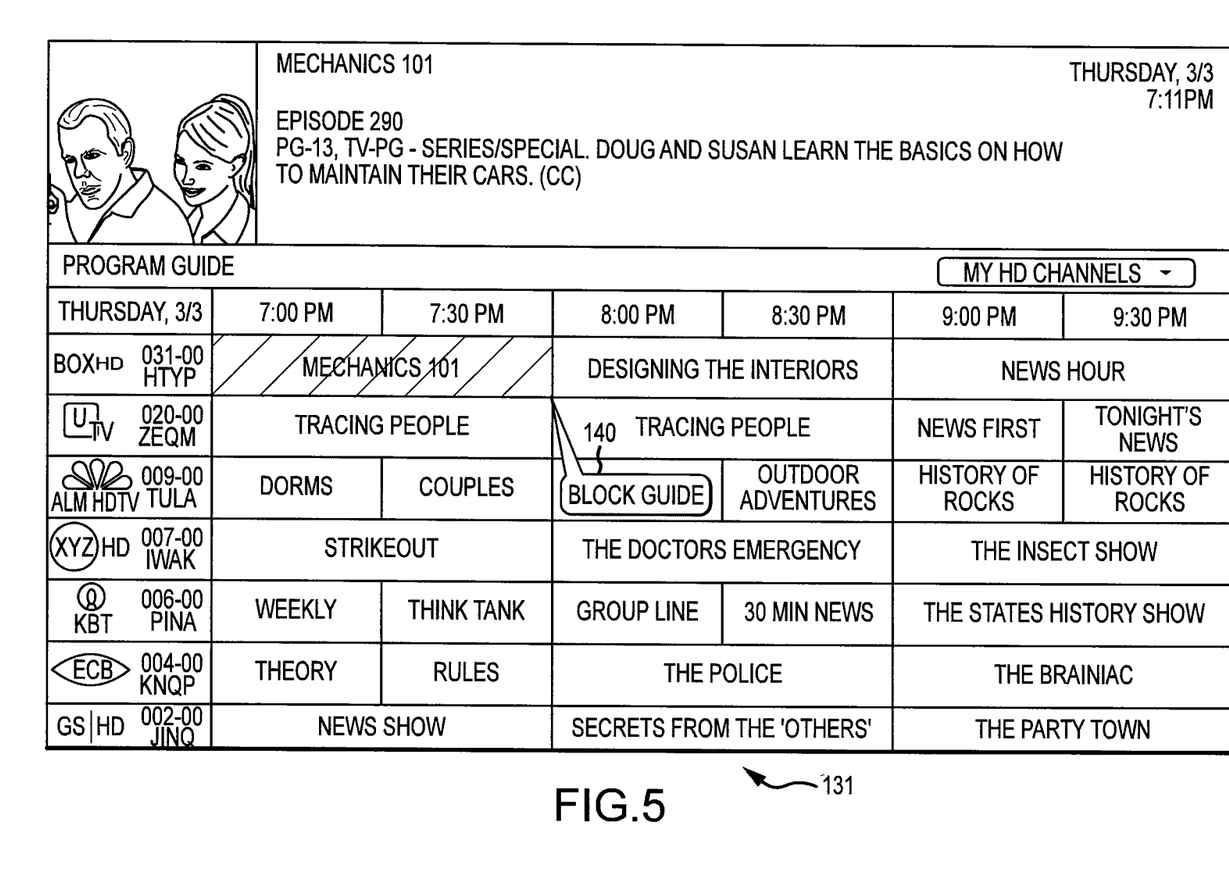
FIG. 5 is a diagram of an electronic program guide showing another option for accessing a block guide, according to another implementation.
Figure 6:
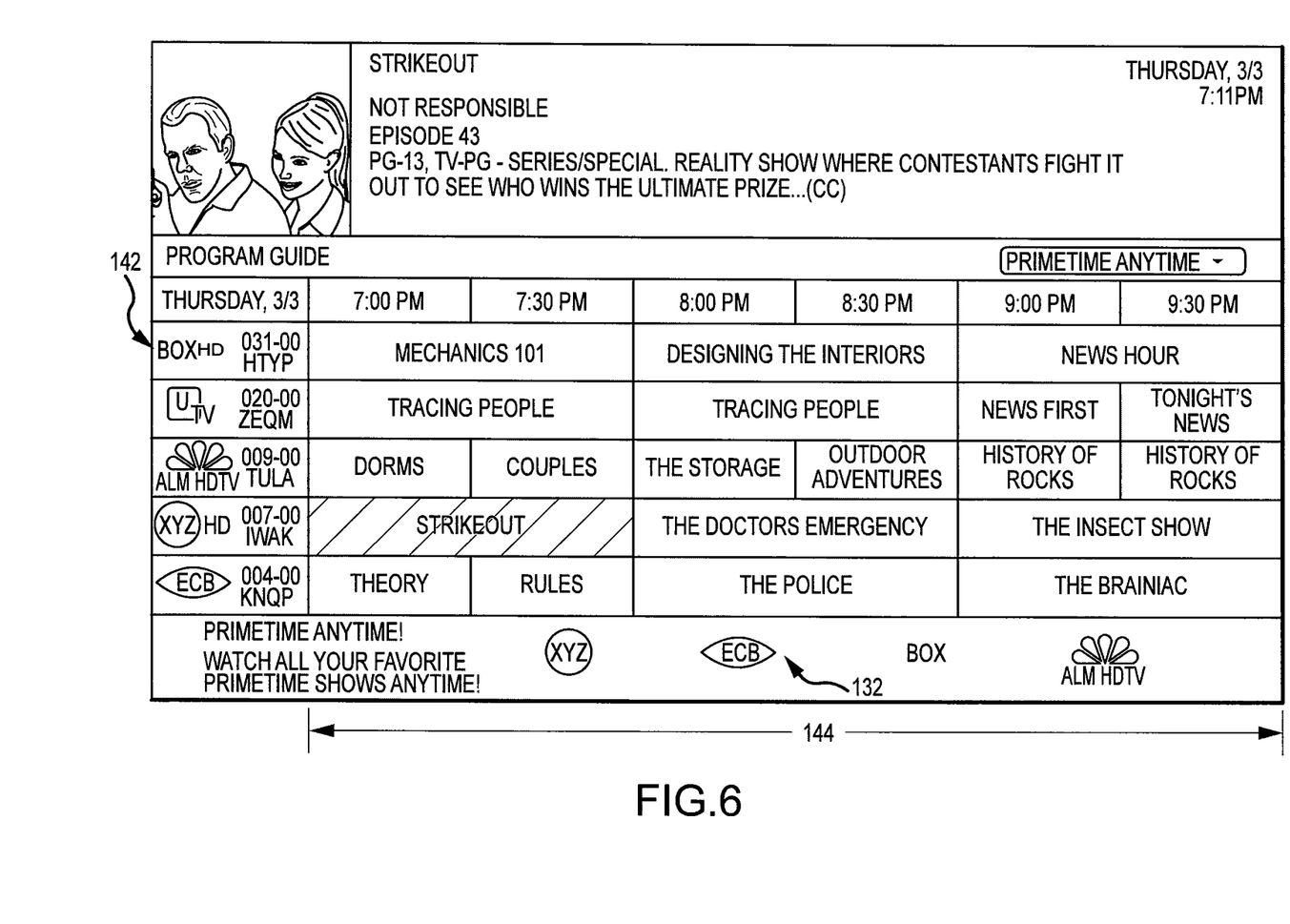
FIG. 6 is a diagram of a block guide according to some implementations.
Figure 7:
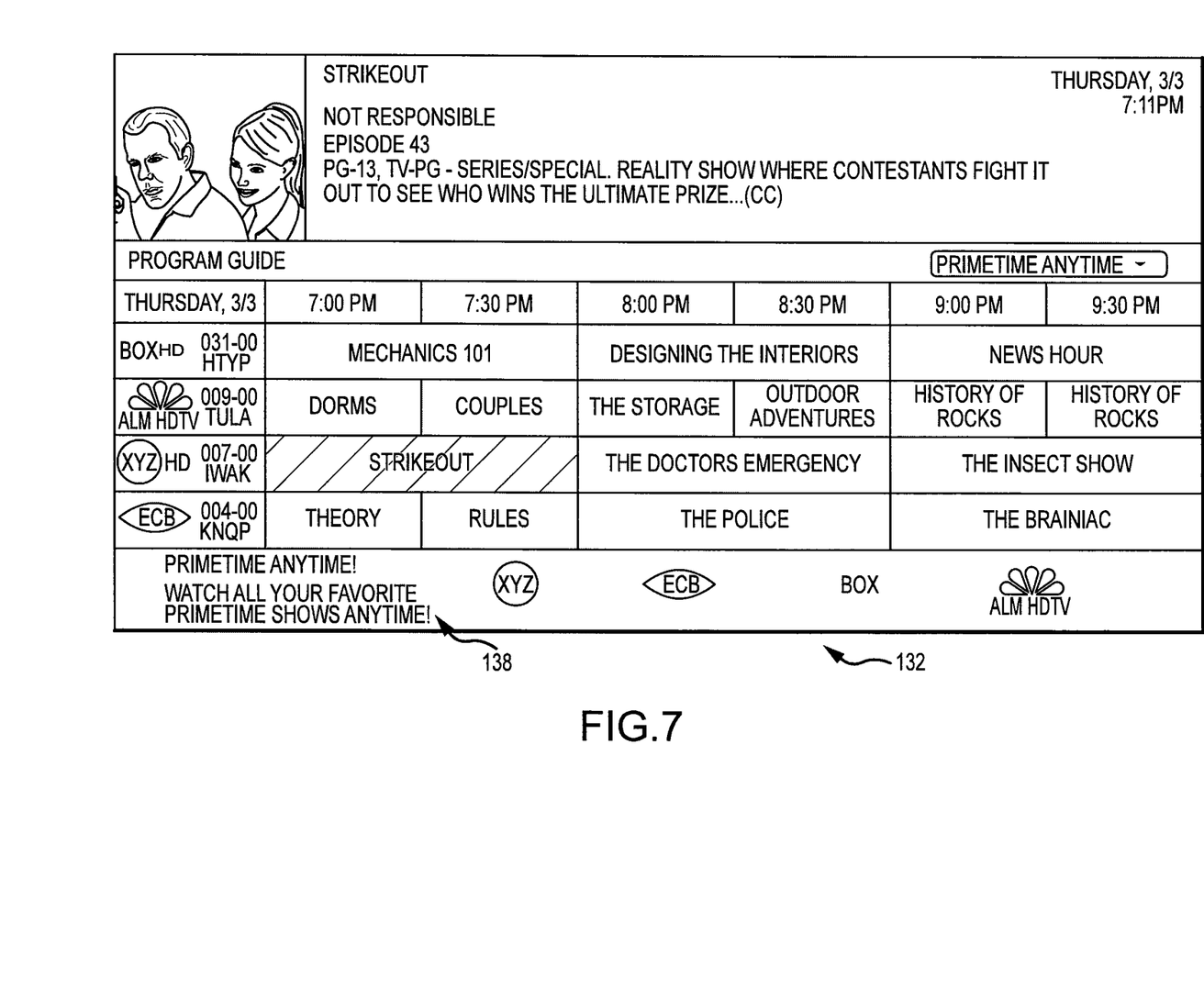
FIG. 7 is a diagram of the block guide of FIG. 6 with a highlighted block guide bar.

Referring now to FIGS. 3-7, a series of selection of menus are shown. Where a block of content, or series of blocks of content, is received and processed as described with respect to FIG. 1, the block of content may be accessible live or from a stored state by a user via one or more dedicated interfaces. That is, an interface may be provided that is particularly adapted for displaying selection options relating to the content being streamed to or stored in the block. In the context of television programming, the dedicated interface may be in the form of a dedicated electronic programming guide (EPG) or block guide 132 (though in some cases a block list may be presented that is not configured as a block guide or other kind of dedicated programming guide). In one implementation, the block guide 132 may include one or more menu screens relating to primetime television and, as such, may include one or more menu screens relating to programming content on, for example, ABC, CBS, NBC, and FOX, from seven PM to ten PM as shown in FIGS. 6 and 7. Other networks, time frames, and other groupings of shows may also be provided. Programming that aired on different days or weeks may also be accessible within the block guide 132. For example, previous episodes of a program may be accessible. This dedicated EPG or block guide 132 may be compiled in one more ways, it may be accessible in one or more ways, and it may include one or more menu screens for accessing content in the block or in related blocks.

In some implementations, the block guide 132 may be a condensed or alternative version of an associated or general EPG usable by a user to access programs outside the block of content. As such, in some implementations, the block guide 132 may be developed by accessing the general EPG and extracting or displaying portions of the general EPG. This process may be performed by, for example, a content receiver 122 or this process may be performed by a service provider. In other implementations, the block guide 132 may be developed wholly separate from the general EPG, but the block guide 132 may still have some overlapping information with the general EPG. The block guide 132, in this implementation, may be developed by a service provider, for example, and transmitted with, or separate, from the block of content. In any of the above cases, the block guide 132 may be stored at a content receiver 122 and a user may access the block guide 132 in several ways.

Figure 3:
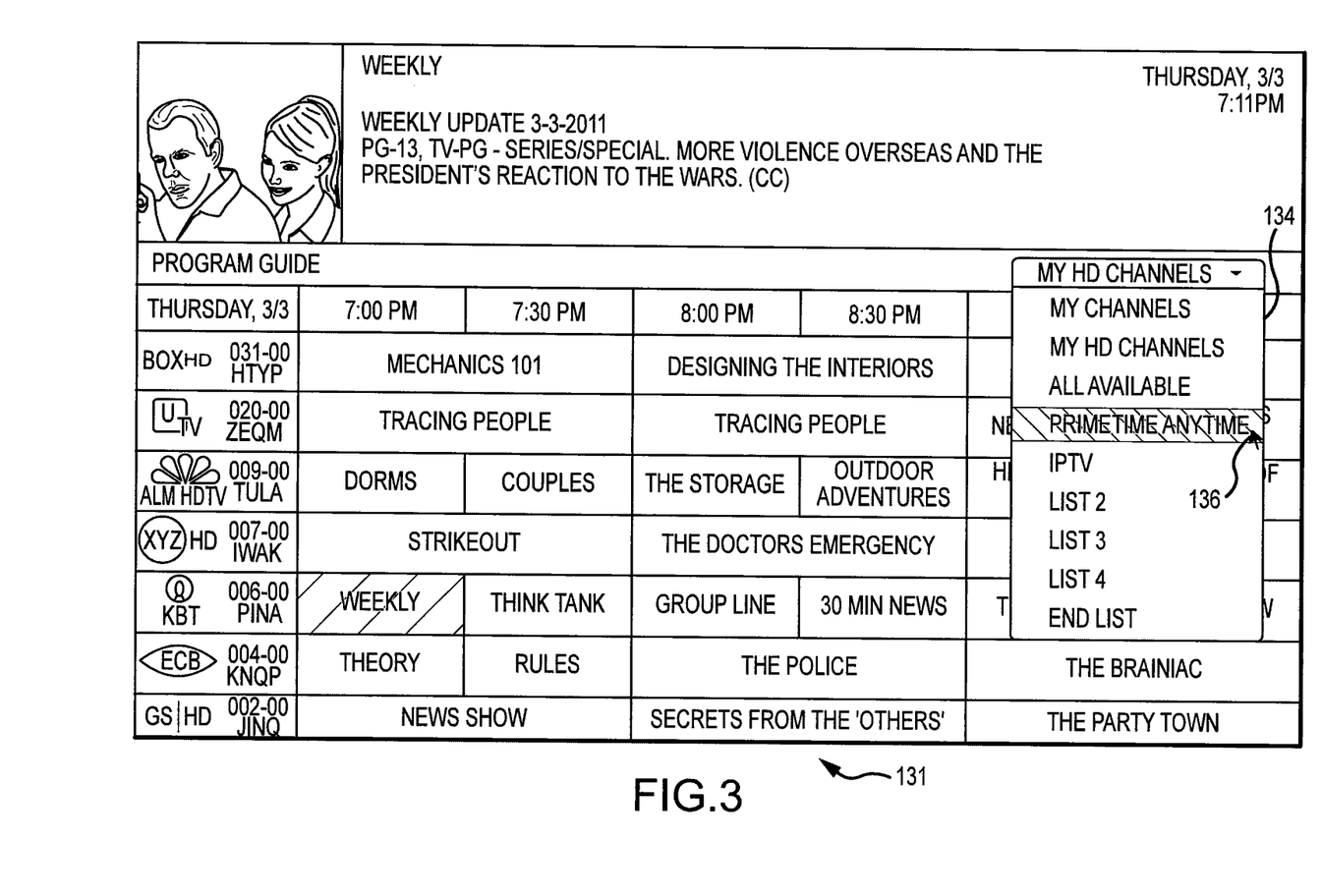
FIG. 3 is a diagram of an electronic program guide showing an option for accessing a block guide, according to some implementations.

Referring now to FIG. 3, a view of a general EPG 131 is shown where options are included for a user to select content including content within or outside the block of content. As shown, the general EPG 131 may include a drop down menu 134 allowing a user to select the format in which they would like to have their program options displayed. The drop down menu 134 may include a block guide option 136. The user may scroll to the block guide option 136 and select the block guide option 136 and the system may present a block guide 132 such as one of those shown in FIGS. 6 and 7, for example. It is noted that other selection options may be provided other than a drop down menu 134. A list menu, a radio button menu, a series of push buttons, or other interface menu options may also be provided.

Referring now to FIG. 4, another view of a general EPG 131 is shown. As with FIG. 3, this general EPG 131 may be arranged to show a series of television channels and the programs available on those channels for several time ranges. As shown, this general EPG 131 may include a channel option in the form of a block guide bar 138. The block guide bar 138 may be arranged between any of the channel selections and it may extend across the whole of the time ranges available. In some implementations, the block guide bar 138 may be arranged near or within the series of channels available in the block guide 132. That is, as shown, block guide bar 138 may be arranged adjacent to the CBS network channel selection, for example. Other locations may be provided and may be selected such that the user can associate the block guide bar 138 with channels available in the block guide 132 or such that the user can at least view the block guide bar 138 when viewing programming options available on channels associated with the block guide 132.

Referring now to FIG. 5, still another view of a general EPG 131 is shown. In this implementation, an interactive feature may be provided allowing the user to access the block guide 132. As shown, the interactive feature may include a pop-up selection 140. The pop-up selection 140 may be triggered when a user highlights, scrolls across, or otherwise preliminarily selects a selection option on one of the channels included in the EPG 131. For example, as shown, a user has highlighted a program on FOX at seven PM. Upon highlighting the program, the general EPG 131 may present a pop-up 140 asking or suggesting that the user use the block guide 132. The pop-up 140 may read "primetime anytime" for example. The pop-up 140 may be triggered when the user scrolls across any program listed for a channel included in the block guide 132. That is, the pop-up 140 may be triggered when the user scrolls across the FOX channel, for example, at any time of day including times outside the timeframe included in the block guide 132. In other implementations, the pop-up 140 may only be triggered when the user scrolls across a program within the time frame included in the block guide 132. In any of the above cases, upon being presented with the pop-up 140, the user may select the pop-up 140 and the system may display a block guide 132, for example, as shown in FIGS. 6 and 7.

In any of the above-mentioned access options, a block guide 132 may be presented revealing content for a particular day. Depending on the time of day the block guide 132 is accessed and the time frame of content available in the block guide 132, a previous day's content or a current day's content may be presented. In some implementations, the day's content that is presented may be based on a cut-off time. For example, where the content in the block of stored content relates to programming available from seven PM to ten PM, a cut-off time of four PM may be established. That is, where the block guide 132 is accessed before four PM, the previous day's content may be presented. However, if it is after four PM, but before the start time of the block window, the current day's content may be presented and may be highlighted as upcoming, for example. The content in the block guide 132 may be presented in a grayscale or other dimmed presentation to indicate that the programming is not yet available. Where the block guide 132 is accessed during the block window, the current day's programming may be presented and the programming that has begun may be presented as available and other programming may be grayed or otherwise signaled as not available. Other cut-off times may be used. For example, the cut-off time may be set to the start time of the block window and accessing the block guide 132 may show the previous day's content until the current day's content begins to be received. Still other cut-off times may be also be used. In some implementations, a user option may be provided for setting the cut-off time. In any of the above-mentioned cut-off time scenarios, the system 120 may check the cut-off time upon being instructed to access the block guide 132 and may compare the current time to the cut-off time to determine which day's block guide 132 to display.

In some implementations, the block guide 132 may be offered to users as an additional service and accessing the block guide 132 may be conditional upon having subscribed to the block guide service. In this implementation, where a user accesses the block guide 132, the system 120 may check for rights to access the block guide 132. Where a user has rights, the block guide 132 may be presented. Where the user does not have rights, an inactive version of the block guide 132 may be presented. For example, an inactive version may include a grayscale type menu such that the potential subscriber can view what the block guide 132 looks like and thus begin to understand how it might work and why they may be interested in subscribing. However, selections within the block guide 132 may not be active and the user may not be able to use the block guide 132 to select content to be displayed. Alternatively, where a user does not have rights, an informational screen may be provided. An informational screen may include a description of the block guide service program and may also include ordering information, for example. A menu of options may be presented on either an inactive block guide or an informational screen including a back button for returning to a previous guide screen and an ordering button, for example. A combination of an inactive block guide and an informational screen may also be provided.

Referring now to FIG. 6, one implementation of a block guide 132 is shown. The block guide 132 may include an interface for accessing the content in the block of content and, as such, may include a table, chart, listing, or other menu reflecting the content available in the block of content. In the context of television programming, for example, the block guide may include one or more channels 142 and the programming available on those channels for a selected airing time 144. The selected airing time 144 may correspond to the time frame or block window within which the block of stored content is received and stored in accordance with FIG. 1. As shown, for example, the block guide 132 may include channels associated with ABC, CBS, NBC, and FOX and may include programming on those channels extending from seven PM to ten PM.

A user may access the block guide 132 in one of the ways mentioned above and may peruse the block guide 132. The user may select a program to view from the block guide 132 and the content receiver 122 may transmit the associated content to the presentation device for viewing. The content receiver 122 may check the content requested and determine whether the selection relates to a live running program or whether the selection relates to stored content. Where the content requested relates to a live running program, the content receiver 122 may receive and transmit the live content. However, where the content requested relates to stored content, the content receiver 122 may access the stored content and transmit the stored content. In some implementations, for example, where a selected program is currently being aired live, but began earlier, the content receiver 122 may prompt the user with a question or selection list requiring input regarding whether they would like to view the program from the beginning or tune in to the live broadcast of the content. The selection list may include "beginning" and "live" options, for example.

Referring now to FIG. 7, a block guide 132 is shown, similar to that shown in FIG. 6. In this figure, however, the block guide bar 138 is shown highlighted and selected by the user. The block guide bar 138 in this view may provide the user with access to a different menu than the block guide bar 138 shown in FIG. 4, for example. That is, the block guide bar 138 in FIG. 4, may bring the user to the block guide 132. In FIG. 7, however, the user is already viewing the block guide 132. As such, selection of the block guide bar in FIG. 7, may provide the user with access to a block guide informational screen. In one implementation, the block guide informational screen may include options for configuring the user's block guides 132. In other implementations, the block guide informational screen may include a listing of available block guides 132. That is, for example, a listing of previous or other days block guides 132 may be shown and available for selection. Other information may also be provided on the block guide informational screen. It is also noted that the block guide bar 138 may be provided in a block guide 132 and may be active when the remaining portion of the block guide 132 is inactive. That is, for example where the block guide 132 is accessed by a non-subscriber, the block guide 132 may be inactive as described above, but the block guide bar 138 may be active. As such, when the block guide bar 138 is selected, an informational screen or an order screen may be presented for the user.

Figure 8:
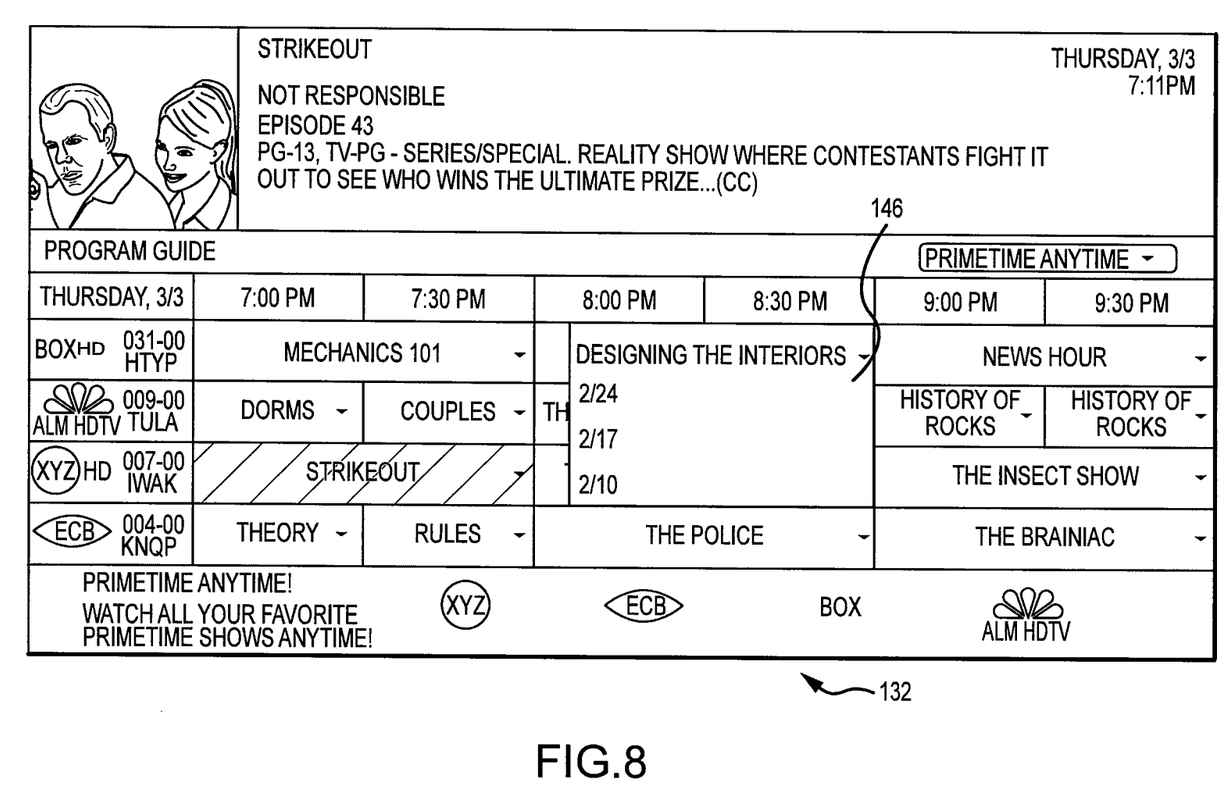
FIG. 8 is a diagram of an additional block guide.

Referring now to FIG. 8, an additional block guide 132 is shown. In this implementation, some of the programs shown include an additional selection option relating to previous episodes. As such, for programs that are part of a series, an additional selection option may be provided. In some implementations, the additional selection option may expand in the form of a list 146 upon scrolling across a particular program. For example, as shown, when scrolling across the program available on FOX at eight PM, an additional list 146 may be presented including previous dates or previous episode names or other indications of previous episodes available via a block of content other than the one reflected in the currently presented guide 132.

In other implementations, the additional selection option 146 may include a link to a menu relating to the associated program. For example, the link may indicate that related episodes, other episodes, or previous episodes are available. Selection of the link by the user may cause the system to display a menu relating to the selected program. The menu may include a general description of the program and may include links to all available episodes, for example.

As described above, a single content receiver may be utilized to simultaneously receive and/or output one or more instances of content receive in a multiplexed signal. Thus, a tuner and smart card combination may be operable to receive multiple instances of content (e.g., multiple channels) simultaneously, which are available for viewing by a user. In accordance with some implementations, a tuner and smart card may be configured to receive and stored multiple channels at once, such as multiple channels broadcast during primetime viewing. While in use to record the multiple channels of content, the tuner may be unavailable to receive content on other frequencies. Thus, a user may not be able to change the tuner to receive some programs. Nonetheless, the user may be able to channel surf within the plurality of instances of content which are currently being received by the tuner. For example, a user may surf between the big four TV networks which are being simultaneously received by a tuner using a single control word.

In accordance with implementations described herein, a content receiver may be configured to identify one or more instances of content being received by a tuner from the same frequency band of at least one content provider and generate a block list of available programs including the one or more instances of content. For example, a receiver may identify that a tuner is being utilized to currently receive four channels, of which one channel of content may be currently output by the receiver for presentation to a user. The receiver may generate a block list for output which identifies the other three instances of content which are available to the user via the tuner at the present time. Thus, the user can select another channel presently being received by the tuner for output by the receiver. The block list may be output in any appropriate manner, such as overlaid onto a presently watched instance of content, or output as a separate menu, EPG or the like. In at least one embodiment, the receiver may include an option, selected via one or more menus, which allows the user to enter a limited channel surfing mode within the multiple instances of receiver content by receiver by a tuner. For example, the user may provide input to change a channel (e.g., via a channel up and down key), in which the receiver does not move numerically through all channels offered by a content provider, but rather moves through a subset of channels currently being received by a tuner.

Although FIGS. 3-8 and the above illustrate and describe generation and/or presentation of a block list that is configured as a block guide, other arrangements are possible. Though in some implementations a block guide may presented as illustrated and described, in other implementations the block list may list instance of content included in a block of content and may not be configured as a plurality of channels having a plurality of programs available for a schedule air time and/or may not be configured to include one or more of the various block guide features illustrated in FIGS. 3-8 and discussed above.

In the present disclosure, the methods disclosed may be implemented as sets of instructions or software readable by a device. Further, it is understood that the specific order or hierarchy of operations in the methods disclosed are examples of sample approaches. In other implementations, the specific order or hierarchy of operations in the method can be rearranged while remaining within the disclosed subject matter. The accompanying method claims present elements of the various operations in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM);

random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context or particular implementations. Functionality may be separated or combined in blocks differently in various implementations of the disclosure or described with different terminology. These and other variations, modifications, additions, and improvements may fall within the scope of the disclosure as defined in the claims that follow.

The invention claimed is:

1. A method of providing access to a block of content, comprising:
   determining, utilizing a content receiver, a plurality of instances of disparate television channels being received by a tuner from a same frequency band via satellite from a content provider, wherein:
      the content provider selected the disparate television channels to be placed on the same frequency band;
      each of the disparate television channels corresponds to a different television network; and
      the plurality of instances of disparate television channels are scrambled using a single control word;
   receiving input at the content receiver from a user to display a block list that lists the plurality of instances of disparate television channels;
   outputting the block list from the content receiver for presentation by a presentation device;
   receiving, at the content receiver, a selection from a user of a first one of the plurality of instances of content; and
   outputting the first one of the plurality of instances of content from the content receiver to the presentation device in response to the selection.

2. The method of claim 1, further comprising storing the plurality of instances of content on a storage medium associated with the content receiver.

3. The method of claim 1, wherein outputting the block list comprises: outputting the block list overlaid onto a second one of the plurality of instances of disparate television channels being output by the content receiver.

4. The method of claim 3, wherein receiving input from a user comprises at least one of receiving input via drop down menu, receiving input from a block list bar, or receiving input from a pop-up.

5. The method of claim 4, wherein receiving input from a pop-up comprises tracking a user's perusal of a general electronic programming guide (EPG) and outputting a pop-up for presentation on the presentation device, when the user scrolls across a channel associated with the block list.

6. The method of claim 5, wherein the pop-up is transmitted when the user scrolls across a channel associated with the block list and at a time corresponding to the content in the block list.

7. The method of claim 1, wherein the tuner is a component of an additional content receiver with which the content receiver is configured to communicate.

8. A method for providing access to content, the method comprising:
   determining, utilizing a content receiver, a plurality of instances of content being received by a tuner from a same frequency band or a plurality of instances of stored content that were received by the tuner from the same frequency band, wherein:
      at least a subset of the plurality of instances of content corresponds to different television networks; and
      the different television networks are scrambled using a single control word;
   outputting a block list from a content receiver to a presentation device, the block list including the plurality of instances of content;
   receiving user input requesting display of an instance of content listed in the block list;
   determining if the instance of content is available live or from a stored state;
   transmitting the instance of content being received by the tuner to the presentation device live if the program is available live; and
   accessing the instance of content from the plurality of instances of stored content if the program is not available live and transmitting the accessed instance of content to the presentation device.

9. The method of claim 8, wherein the block list is configured as a plurality of channels having a plurality of programs available for the selected airing time, the airing time corresponding to a time frame for which content has been or is scheduled to be stored as a block of stored content.

10. The method of claim 8, further comprising providing a drop down menu for each instance of content available in the block list, the menu providing access to previous episodes of the respective instance of content.

11. The method of claim 10, wherein the drop down menu comprises a link to a program menu including a listing of all stored previous episodes of the respective instance of content.

12. The method of claim 11, wherein the tuner is a component of an additional content receiver with which the content receiver is configured to communicate.

13. A system for providing access to content, the system comprising:
   at least one content receiver, comprising:
      at least one processor that determines a plurality of instances of disparate television channels being received by a tuner from a same downlink frequency band via satellite from a content provider and that receives an input from a user to display a block list that lists that plurality of instances of disparate television channels and that generates the block list, wherein:
         the content provider selected the disparate television channels to be placed on the same frequency band;
         each of the disparate television channels corresponds to a different television network; and
         the plurality of instances of disparate television channels are scrambled using a single control word;
      wherein the at least one content receiver is configured to output the block list from the content receiver to a presentation device responsive to the input;

wherein the at least one processor receives a selection from a user of a first one of the plurality of instances of disparate television channels and accesses the first one of the instances of disparate television channels responsive to the selection, the output component operable to output the first one of the plurality of instances of disparate television channels responsive to the selection.

14. The system of claim 13, wherein the tuner is incorporated into the at least one content receiver.

15. The system of claim 13, wherein the tuner is incorporated into another content receiver, the at least one processor configured to communicate with the other content receiver and instruct the other content receiver to transmit the first one of the instances of disparate television channels to the content receiver.

16. The system of claim 13, wherein the at least one processor is configured to coordinate storage of the plurality of instances of disparate television channels on a storage medium associated with the content receiver.

17. The system of claim 13, wherein the at least one processor is configured to output the block list overlaid onto a second one of the plurality of instances of disparate television channels being output by the content receiver.

18. The system of claim 13, wherein the block list identifies the plurality of instances of disparate television channels by a program title.

19. The system of claim 13, further comprising: a tuner; the output component operable to output the first one of the plurality of instances of disparate television channels to a first presentation device and output a second one of the plurality of instances of disparate television channels to a second presentation device.

20. A system for providing access to content, the system comprising:

a satellite-based multichannel video programming distributor system, configured to:
  select disparate television channels to be placed on an uplink frequency band, wherein each of the disparate television channels corresponds to a different television network and is scrambled using a single control word;
  multiplex the selected multiple disparate television channels onto the uplink frequency band; and
  transmit the uplink frequency band to a satellite;
a satellite configured to receive the uplink frequency band and broadcast to at least one content receiver the multiplexed multiple disparate television channels as a downlink frequency band; and
the at least one content receiver, comprising at least one processor that:
  determines the multiple disparate television channels being received by a tuner of the content receiver from the downlink frequency band via the satellite from the satellite-based multichannel video programming distributor;
  receives an input from a user to display a block list that lists that plurality of instances of disparate television channels and that generates the block list, wherein:
    the at least one content receiver is configured to output the block list from the content receiver to a presentation device responsive to the input;
  receives a selection from the user of a first one of the plurality of instances of disparate television channels; and
  accesses the first one of the instances of disparate television channels responsive to the selection, the output component operable to output the first one of the plurality of instances of disparate television channels responsive to the selection.

* * * * *